United States Patent
Yates et al.

(10) Patent No.: US 11,162,426 B2
(45) Date of Patent: Nov. 2, 2021

(54) ASSEMBLY OF A SERVO PUMP AND A HYDRAULIC MOTOR

(71) Applicant: ROLLS-ROYCE plc, London (GB)

(72) Inventors: Martin K. Yates, Northamptonshire (GB); Stephanie E. Watkins, Walsall (GB); Geir Leivseth, Derbyshire (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/932,940

(22) Filed: Jul. 20, 2020

(65) Prior Publication Data
US 2021/0025331 A1  Jan. 28, 2021

(30) Foreign Application Priority Data

Jul. 25, 2019 (GB) ..................... 1910626

(51) Int. Cl.
*F02C 7/228* (2006.01)
*F15B 13/02* (2006.01)
*F23R 3/34* (2006.01)

(52) U.S. Cl.
CPC ............ *F02C 7/228* (2013.01); *F15B 13/022* (2013.01); *F23R 3/346* (2013.01); *F05D 2240/35* (2013.01); *F05D 2260/60* (2013.01)

(58) Field of Classification Search
CPC ........ F02C 7/228; F15B 13/022; F15B 15/18; F23R 3/346; F05D 2240/35; F05D 2260/60; F04C 2/084; F04C 2/086; F04C 2/18; F04C 11/001; F04C 11/003; F04C 11/008; F04C 15/0038; F04C 15/0026; F04C 15/0023; F04C 15/008

USPC ................. 417/348, 391, 392, 405
See application file for complete search history.

(56) References Cited

U.S. PATENT DOCUMENTS

| 5,823,541 A | * | 10/1998 | Dietle | ................... E21B 43/126 277/320 |
| 5,916,139 A | | 6/1999 | Tieben | |
| 2005/0262824 A1 | * | 12/2005 | Yates | ....................... F02C 9/32 60/39.281 |

(Continued)

FOREIGN PATENT DOCUMENTS

| DE | 9417754 U1 | 6/1995 |
| DE | 20305937 | 5/2004 |

(Continued)

OTHER PUBLICATIONS

Great Britain search report dated Jan. 24, 2020, issued in GB Patent Application No. 1910626.9.

(Continued)

*Primary Examiner* — Steven M Sutherland (57) ABSTRACT

An assembly of a servo pump and a hydraulic motor. The assembly has a housing which contains the pump and the motor. The motor has a rotating body which rotates under the motive power of a pressurised motor liquid flow. The motor has a high pressure region which receives the pressurised motor liquid flow, and a low pressure region through which the motor liquid flow leaves the motor. The pump also has a rotating body. The pump has a low pressure region which receives servo liquid flow to be pumped by its rotating body, and a high pressure region through which pressurised servo liquid flow leaves the pump. Each rotating body is mounted on a respective journal.

9 Claims, 9 Drawing Sheets

(56) References Cited

U.S. PATENT DOCUMENTS

2007/0113554 A1* 5/2007 Yates ................ F02C 7/236
                                                                      60/734
2018/0372321 A1    12/2018 Yates et al.

FOREIGN PATENT DOCUMENTS

| EP | 2339147 | 6/2011 |
| FR | 1159193 A | 6/1958 |
| GB | 1125574 | 8/1968 |

OTHER PUBLICATIONS

European search report dated Dec. 2, 2020, issued in EP Patent Application No. 20182131.1.

* cited by examiner

ASSEMBLY OF A SERVO PUMP AND A HYDRAULIC MOTOR

CROSS-REFERENCE TO RELATED APPLICATIONS

This specification is based upon and claims the benefit of priority from United Kingdom patent application number GB 1910626.9 filed on Jul. 25, 2019, the entire contents of which is incorporated herein by reference.

BACKGROUND

Technical Field

The present disclosure relates to an assembly of a servo pump and a hydraulic motor.

Description of the Related Art

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging condition.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with each feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

However, a problem with such a system is how to accommodate an FSV servicing mains flow failing to an open condition. In pilot-only operation, when cooling flow is passing through a recirculation manifold and the mains manifold, such a failure can result in the cooling flow passing through the failed open FSV through one injector into the combustor, causing a hot streak which may lead to nozzle and turbine damage. In pilot and mains operation, such a failure can produce a drop in mains manifold pressure which causes other mains FSVs to close. A possible outcome is again that a high proportion of the total mains flow passes through the failed open FSV to one injector, causing a hot streak leading to nozzle and turbine damage.

United States patent application US 2018/0372321 A1 proposes a lean burn combustion staging system with a servo line extending in series through mains flow control valves of the injectors rather than mains FSVs. In this system, the servo pump can be gear-type positive displacement pump powered by a fueldraulic motor (i.e. a hydraulic motor where the powering liquid is fuel) which takes its motive power from a flow diverted from the output of a high pressure pumping stage of the engine's fuel pumping unit. The diverted flow is then spilled back to a lower pressure at the inlet to the high pressure pumping stage.

A problem with such a combined servo pump and fueldraulic motor, however, is to prevent fugitive leakage of metered fuel flow from the pump flow circuit into the motor motive flow circuit, or vice versa. Another problem is to control axial loads acting on thrust faces of bearings in the pump and motor, efficient control of these axial loads being important in ensuring the reliable operation of the machine.

SUMMARY

According to a first aspect there is provided an assembly of a servo pump and a hydraulic motor, wherein:

the assembly has a housing which contains the pump and the hydraulic motor;

the hydraulic motor has a rotating body which rotates under the motive power of a pressurised motor liquid flow, whereby the hydraulic motor has a high pressure region which receives the pressurised motor liquid flow, and a low pressure region through which the motor liquid flow leaves the hydraulic motor;

the pump has a rotating body, whereby the pump has a low pressure region which receives servo liquid flow to be pumped by its rotating body, and a high pressure region through which pressurised servo liquid flow leaves the pump;

each rotating body is mounted on a respective journal, each journal being supported on one side of the gear pair by a respective first bearing block and being supported on the opposite side of its rotating body by a respective second bearing block, each bearing block having a running face adjacent to its rotating body and a non-running face distal from its rotating body;

the assembly has a mechanical linkage having a coupling at one end to the journal of the motor rotating body and a coupling at an opposite end to the journal of the pump rotating body such that the rotation of the motor rotating body is transferred via the linkage to the pump rotating body;

respective static seals seal the non-running faces of the bearing blocks to the housing such that the high pressure region of the hydraulic motor is sealed from the low pressure region of the hydraulic motor, and the high pressure region of the pump is sealed from the low pressure region of the pump; and a pair of dynamic seals on opposite sides of the pump rotating body seal the journal of the pump rotating body to the housing to seal the low pressure region of the hydraulic motor from the low pressure region of the pump.

Advantageously, the dynamic seals can reduce or prevent fugitive leakage between the pump flow circuit and the motor motive flow circuit, while the static seals can ensure that the axial loads acting on the running faces are consistent with adequate sealing of the low and high pressure regions at the non-running faces of each bearing block. More particularly, the static seals can define the pressure acting on the non-running face of the bearing blocks and contribute to the axial forces on a bearing block which load it against its rotating body. The dynamic seals can then determine the pressures that the static seals are exposed to, as well as preventing fugitive leakage between the hydraulic motor and pump circuits. In general, the pressures in the pump and motor are different, but the combined effect of the static and dynamic seals segregating these pressures enables the axial loads in the pump and motor to be controlled within acceptable limits despite the two machines being at different pressures.

According to a second aspect there is provided a combustion staging system for fuel injectors of a multi-stage combustor of a gas turbine engine, the combustion staging system having:

a splitting unit which receives a metered total fuel flow and controllably splits the metered total fuel flow into out-going pilot and mains fuel flows to perform pilot-only and pilot-and-mains staging control of the combustor;

pilot and mains fuel manifolds which respectively receive the pilot and mains fuel flows;

a plurality of mains flow scheduling valves which distribute the mains fuel flow from the mains fuel manifold to mains discharge orifices of respective injectors of the combustor; and a servo line which extends through each of the mains flow scheduling valves in series, the servo line being controllably fillable with pressurised fuel to change the pressure in the servo line relative to pressure in the mains fuel manifold;

wherein each mains flow scheduling valve has a chamber containing a movable piston, the chamber to a mains side of the piston being fed by the mains fuel manifold, the chamber to a servo side of the piston being fed by the servo line, the piston having an open pilot-and-mains position which allows flow out of the mains side of the chamber to the mains discharge orifice of the respective injector, the piston being biased towards a closed pilot-only position which prevents flow out of the mains side of the chamber to the mains discharge orifice of the respective injector, and the piston being movable to the closed position under an increase in pressure in the servo line relative to the mains fuel manifold; and wherein the combustion staging system further has the assembly of the first aspect, the servo pump being operable to change the fuel pressure in the servo line, and motive power for the hydraulic motor being fuel diverted from a high pressure output of a fuel pump of the gas turbine engine, the hydraulic motor returning the diverted fuel to a low pressure input of the fuel pump.

Thus the combustion staging system can be such as disclosed in US 2018/0372321 A1.

According to a third aspect there is provided a fuel supply system having:

a fuel pump having a low pressure input and a high pressure output;

a fuel metering valve which is configured to receive a flow of pressurised fuel from the high pressure output and to form therefrom a metered total fuel flow; and a combustion staging system according to the second aspect, the splitting unit of the combustion staging system receiving the metered total fuel flow from the fuel metering valve, and the motive power for the hydraulic motor being fuel diverted from the high pressure output of the fuel pump, the hydraulic motor returning the diverted fuel to the low pressure input of the fuel pump.

According to a fourth aspect there is provided a gas turbine engine for an aircraft having a multi-stage combustor and the fuel supply system according to the third aspect for fuel injectors of the combustor.

Optional features of the present disclosure will now be set out. These are applicable singly or in any combination with any aspect of the present disclosure.

The assembly may further have: a first controlled leakage path from the high pressure region of the motor to an intermediate pressure region of the assembly, the intermediate pressure region being in fluid communication with a bore of the journal of the pump rotating body, and the first controlled leakage path being configured to reduce the pressure of the pressurised motor liquid flow such that the motor liquid in the intermediate pressure region is at pressure intermediate to that of the high and low pressure regions of the motor; and a second controlled leakage path from the bore of the journal of the pump rotating body to the low pressure region of the motor. In this way, the first and second controlled leakage paths can produce a leakage flow of the motor liquid through the bore which lubricates the couplings of the mechanical linkage. The lubrication can thus reduce wear of the couplings. As the leakage flow ultimately flows from the high pressure region of the motor to the low pressure region of the motor, it does not compromise the sealing performance of the static and dynamic seals. Conveniently, the amount of the leakage flow can be determined by a calibrated orifice provided in the first controlled leakage path.

Conveniently, the motor may be an external gear pinion motor having a pair meshing pinion gears which rotate under the motive power of the pressurised motor liquid flow (i.e. the motor rotating body is then a first one of these pinion gears). Similarly, the pump may be an external gear pinion pump having a pair of meshing pinion gears, one of the pinion gears of the pump being a drive gear and the other of the pinion gears of the pump being a driven gear (i.e. the pump rotating body is then the drive gear). In this case, each pinion gear may be mounted on a respective journal, the two journals of each pair of meshing pinion gears being supported on one side of the gear pair by a respective first bearing block and being supported on the opposite side of the gear pair by a respective second bearing block, each bearing block having a running face adjacent to its pair of gears and a non-running face distal from its pair of gears. Moreover, the coupling at one end of the mechanical linkage may be to the journal of a first one of the pinion gears of the motor and the coupling at the opposite end is to the journal of the drive gear of the pump such that the rotation of the pinion gears of the motor is transferred via the linkage to the drive gear of the pump; and the pair of dynamic seals may be on opposite sides of the drive gear of the pump, thereby sealing the journal of the drive gear to the housing. In this case, the static seals may be cardioid-shaped to seal each high pressure region from the respective low pressure region.

However, this does not exclude that variant assemblies may be based on other motor/pump types. For example, the motor may be an external gear pinion motor as described above, a vane motor (i.e. in which the motor rotating body is a vaned rotor), or a gerotor motor (typically in which the motor rotating body is a central rotor of the gerotor). Additionally or alternatively, the pump may be an external gear pinion pump as described above, a vane pump (i.e. in which the pump rotating body is a vaned rotor), or a gerotor pump (typically in which the pump rotating body is a central rotor of the gerotor).

The static seals may be formed from an elastomeric material.

Conveniently, the couplings of the mechanical linkage may be respective splined couplings. However, other possible coupling types are square drives or wire drives.

Conveniently, the motor liquid and the servo liquid may be the same liquid.

Conveniently, the motor liquid and the servo liquid may be fuel for a combustion engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
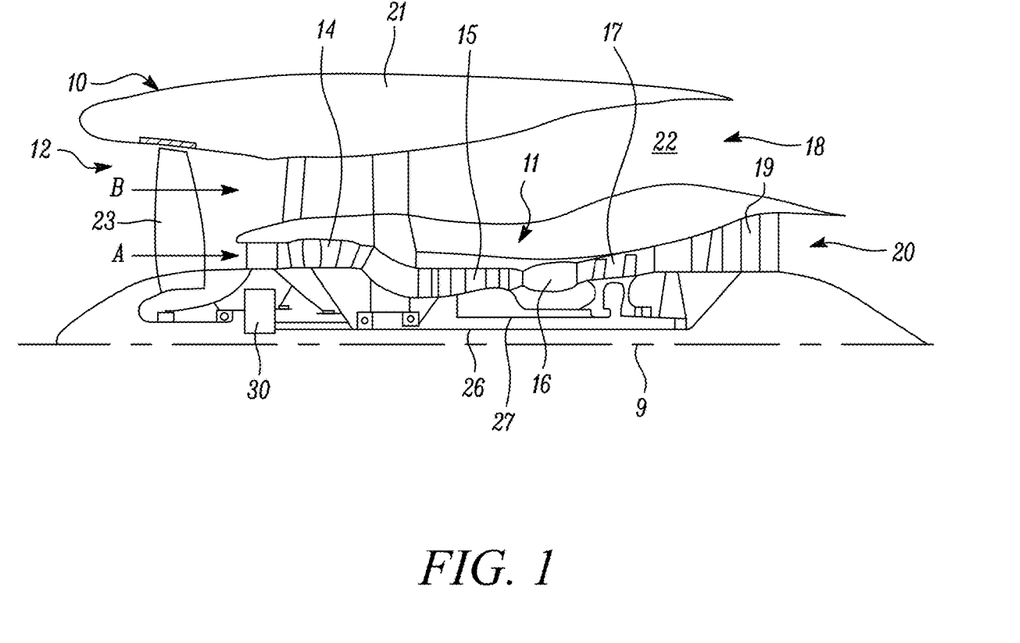
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
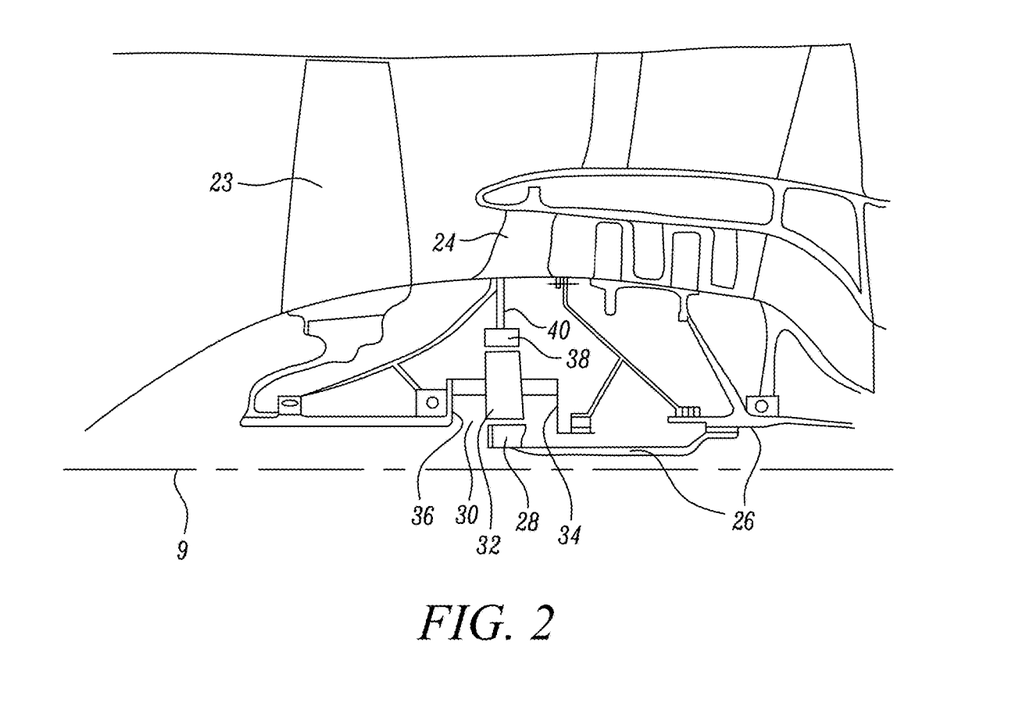
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
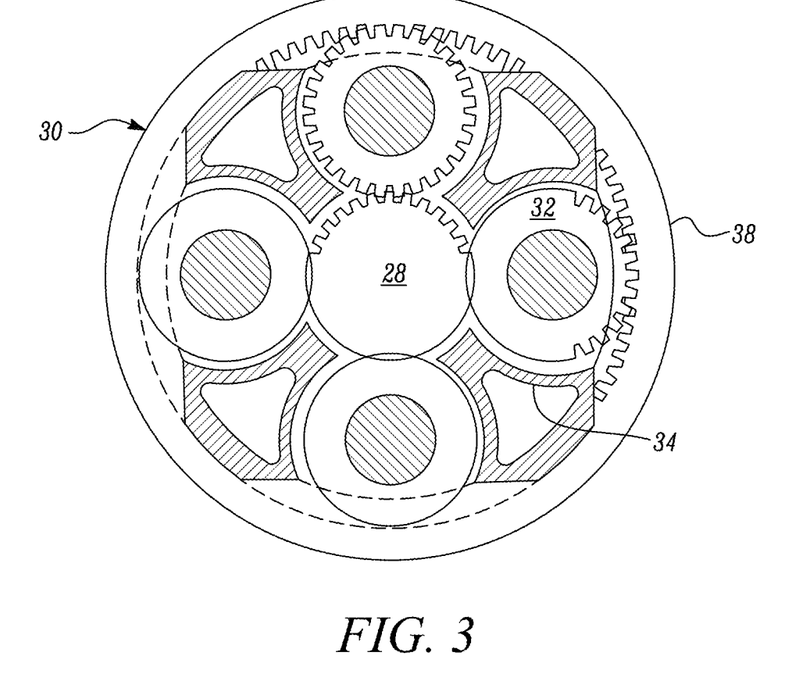
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the embodiments of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The engine 10 has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine high pressure shaft 27 via an engine accessory gearbox. Between the LP and the HP stages the fuel is typically heated in a fuel/oil heat exchanger (FOHE) and filtered to remove contaminants and ice.

A fuel supply system then accepts fuel from the HP pumping stage for feeds to the combustor 16 of the engine 10. This system typically has a hydro-mechanical unit (HMU) comprising a fuel metering valve operable to control the rate at which fuel is allowed to flow to the combustor. The HMU may further comprise a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof in a filtered servo flow for correct operation of any fuel pressure operated auxiliary devices (such variable inlet guide vane or variable stator vane actuators) that receive fuel under pressure from the HMU. Further details of such an HMU are described in European patent application EP 2339147 A2.

An engine electronic controller (EEC—not shown) commands the HMU fuel metering valve to supply fuel at a metered total flow rate to a staging system 130 (shown schematically in FIG. 4 in pilot+mains operation mode, and in FIG. 5 in pilot-only operation mode) and thence to fuel injectors of the combustor 16.

Figure 4:
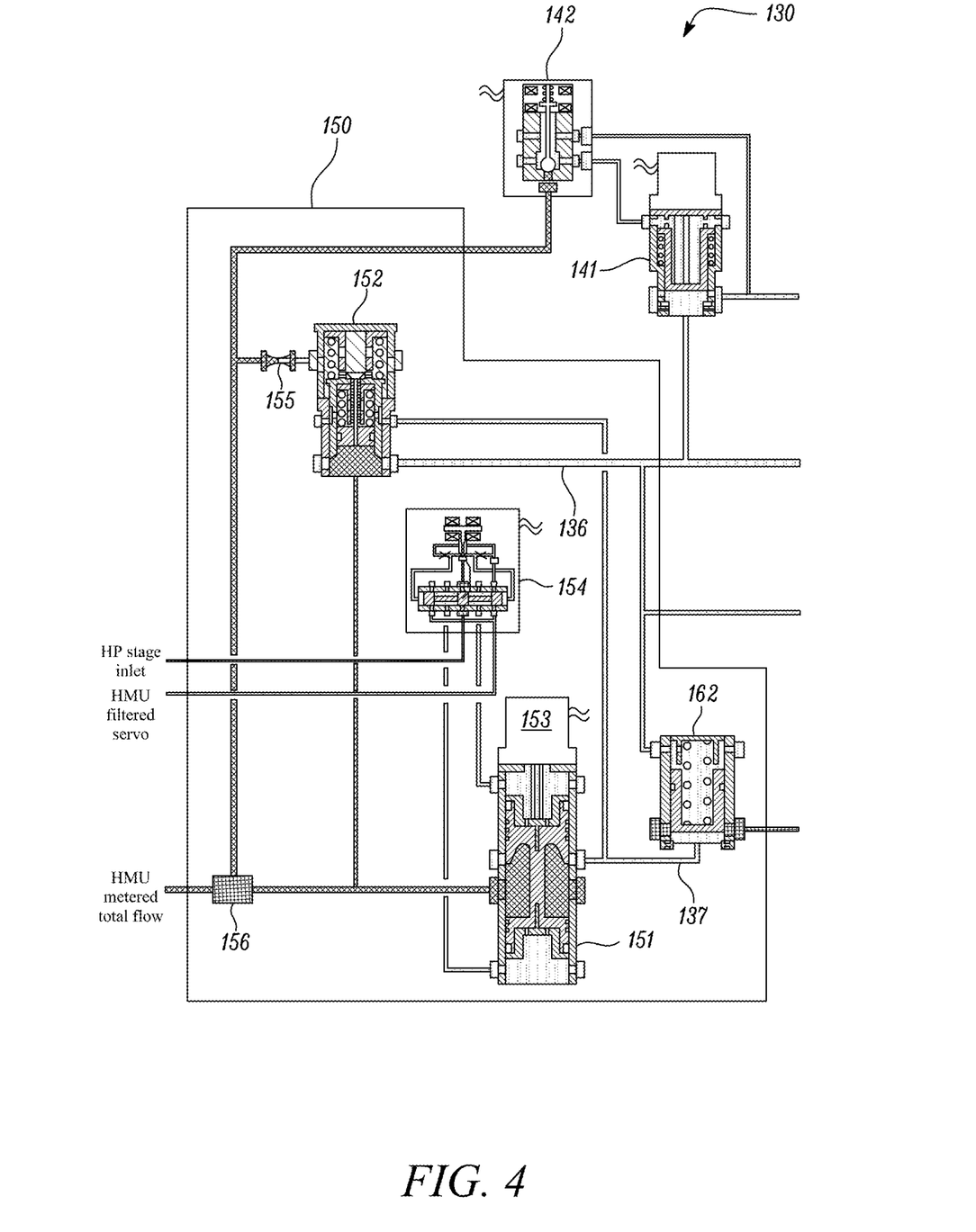
FIG. 4 shows schematically a staging system in pilot+mains operation mode.
Figure 5:
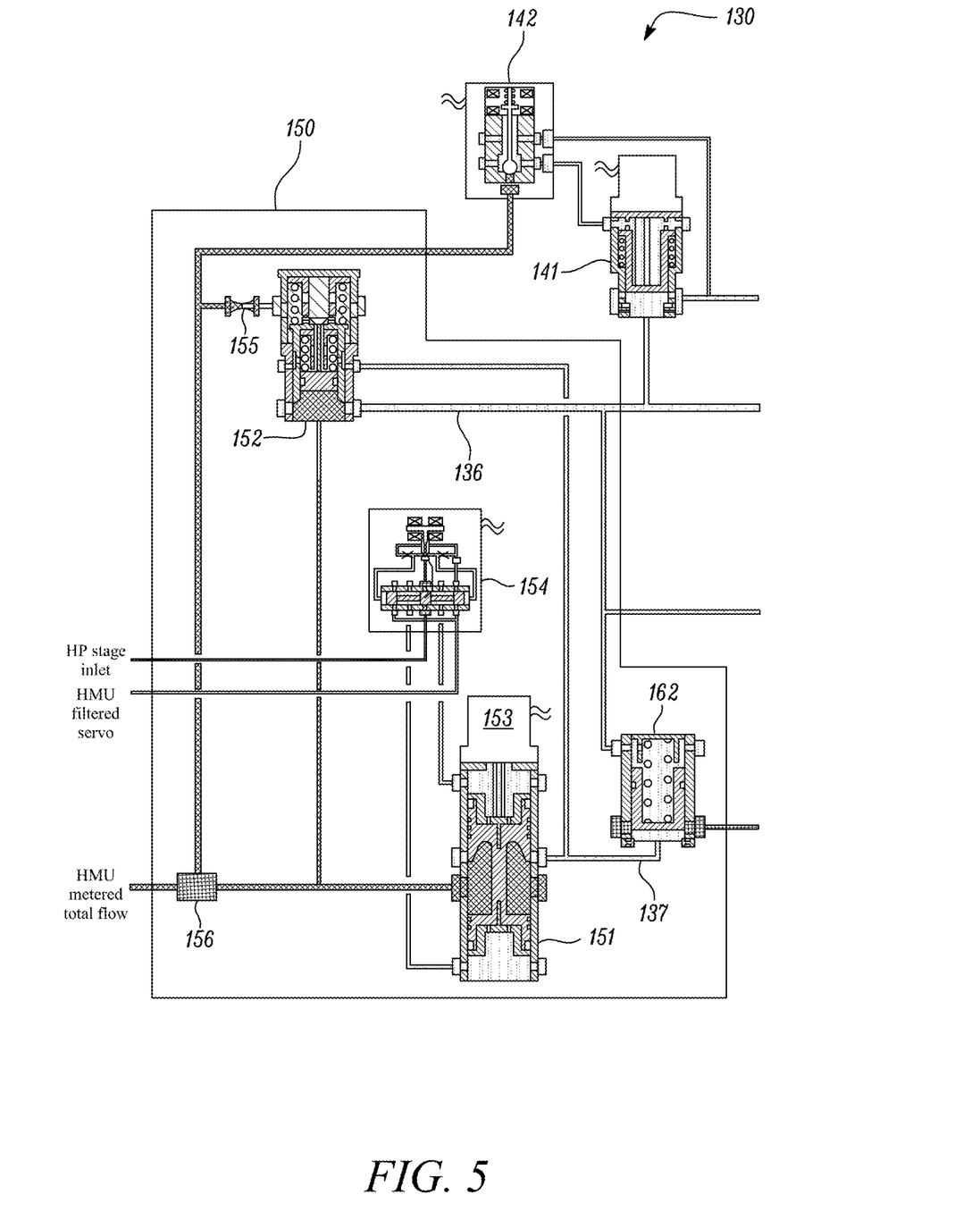
FIG. 5 shows schematically the staging system in pilot-only operation mode.

The staging system 130 splits the fuel under the control of the EEC into two flows: one for first 131 and second 132 pilot manifolds and the other for a mains manifold 133. The first pilot manifold feeds pilot discharge orifices of a subset of the fuel injectors (via respective weight distribution valves—WDVs). The second pilot manifold feeds pilot discharge orifices of the rest of the fuel injectors (also via respective WDVs). The mains manifold feeds mains discharge orifices of all the fuel injectors. A splitting unit 150 (described in more detail below) receives the metered total fuel flow from the HMU and produces an outgoing flow split between a pilot connection pipe 136 which delivers fuel to the first 131 and second 132 pilot manifolds and a mains connection pipe 137 which delivers fuel to the mains manifold 133. The second pilot manifold 132 connects to the pilot connection pipe 136 via a further connection pipe 139 and a lean blow out protection valve 141 controlled by way of a solenoid-operated control valve 142. The splitting unit also sends a cooling flow to the mains manifold during pilot-only operation. The splitting unit has a fuel flow metering and spill architecture rather than a fuel flow splitting valve and a fuel flow sensing valve, but an architecture based on a fuel flow splitting valve could be implemented instead.

The staging system 130 has a mains cooling valve 147 which in pilot-only operation opens a bypass connection between the mains manifold 133 and the pilot connection pipe 136, allowing the cooling flow sent to the mains manifold 133 during pilot-only operation to pass from the mains fuel manifold to the pilot fuel manifolds, and thence onwards for burning at the pilot orifices of the injectors 134. The mains cooling valve 147 closes during pilot-and-mains operation.

Mains flow control valves 140 are provided at the injectors 134, and the mains fuel manifold 133 is split into a primary line 133a and a servo line 133b which each receive a respective portion of the mains fuel flow. The mains flow control valves 140 distribute the mains flow from the primary line to the mains discharge orifices in the injectors 134 via respective WDVs, and the operation of the mains flow control valves is controlled by a pressure differential between the primary and the servo lines. This arrangement is discussed further below after a more detailed discussion of the splitting unit 150.

Returning to the splitting unit 150, this has a staging metering valve (SMV) 151 providing a variable metering orifice with a known, and accurately controlled, relationship between area and metering spool position. Control of the position of the spool of the SMV allows control of the metering orifice area. The position of the metering piston is measured using a position sensor, such as an LVDT 153, and its position is controlled using a two stage servo-valve (MSV) 154. A staging spill valve (SSV) 152 of the splitting unit 150 controls the pressure differential set across the metering orifice such that control of metering valve position gives accurate control of flow delivered by the SMV into the mains connection pipe 137, this flow being the mains fuel flow sent to the mains manifold 133.

However, the fuel flow delivered through the staging metering valve (SMV) 151 is only a first portion of the HMU total metered fuel flow received by the splitting unit 150. A second portion of the received total metered fuel flow passes through a staging spill valve (SSV) 152 into the pilot connection pipe 136 to form the pilot fuel flow. The SSV can be a two-stage valve, with a pilot (first) stage of the SSV sensing the pressure differential set across the SMV and varying the position of a second stage piston to vary the area of the spill profile in a valve sleeve. Similarly, the SSV can be a single stage valve with a single piston both sensing the pressure differential set across the SMV and moving to vary the area of the spill profile. Opening the spill profile of the SSV permits more spill flow to pass to the pilot connection pipe and thus reduces the mains fuel flow from the SMV (as the mains flow+the pilot flow=HMU total metered fuel flow). The converse is true for SSV closure.

The SMV 151 is used to meter flow to the mains connection pipe 137 when mains is both staged-in or staged-out. In the latter case, a residual metered flow from the SMV can be used to form the cooling flow sent to the mains manifold 133 during pilot-only operation. For example, when the spool of the SMV moves into a position corresponding to pilot-only operation (FIG. 5) it could open an additional port on the SMV (not shown in FIG. 5) to open the cooling flow path. However, as shown in FIG. 5, another option is for the two-stage SSV 152 to meter a fixed flow in parallel to the SMV metering orifice. This flow is formed from a third portion of the received total metered fuel flow and is taken from a flow washed filter (SFWF) 156 at the inlet to the splitting unit 150. It then passes through a fixed servo orifice (SSO) 155 before passing through a variable poppet orifice within the SSV into the mains connection pipe downstream of the SMV. The rate of this fixed flow can be aligned with the cooling flow required to cool the mains manifold, allowing the SMV to be fully closed in pilot-only operation.

The metering and spill architecture of the splitting unit maintains flow in the both the pilot manifolds 131, 132 and the mains manifold 133 when the engine is running. In pilots-only mode of operation, cooling flow is metered into the mains manifold for cooling purposes and re-joins the pilots burnt flow stream via the mains cooling valve 147.

A non-return valve 157 can be added to the bypass connection controlled by the mains cooling valve 147 between the pilot manifolds 131, 132 and the mains manifold 133. The non-return valve accommodates a scenario where one of the mains flow control valves 140 has failed open when mains is staged-out. Without the non-return valve it would be possible for pilot flow to pass to the mains manifold. This flow would increase as the pressure differential across the pilot discharge orifices of the fuel injectors increases. Passing to the mains combustion zone through the failed mains flow control valve, the flow could result in localised heating of turbine components, leading to a reduction of turbine life and possible turbine failure.

As mentioned above, the staging system 130 includes a lean blow out protection valve (LBOV) 141 controlled by way of a solenoid-operated control valve (LBSV) 142. The high pressure feed for the LBSV can be configured to be taken from the SFWF 156 at the inlet to the splitting unit 150. Any leakage flow from this feed then returns to the second pilot manifold 132 via the further connection pipe 139.

Figure 7A:
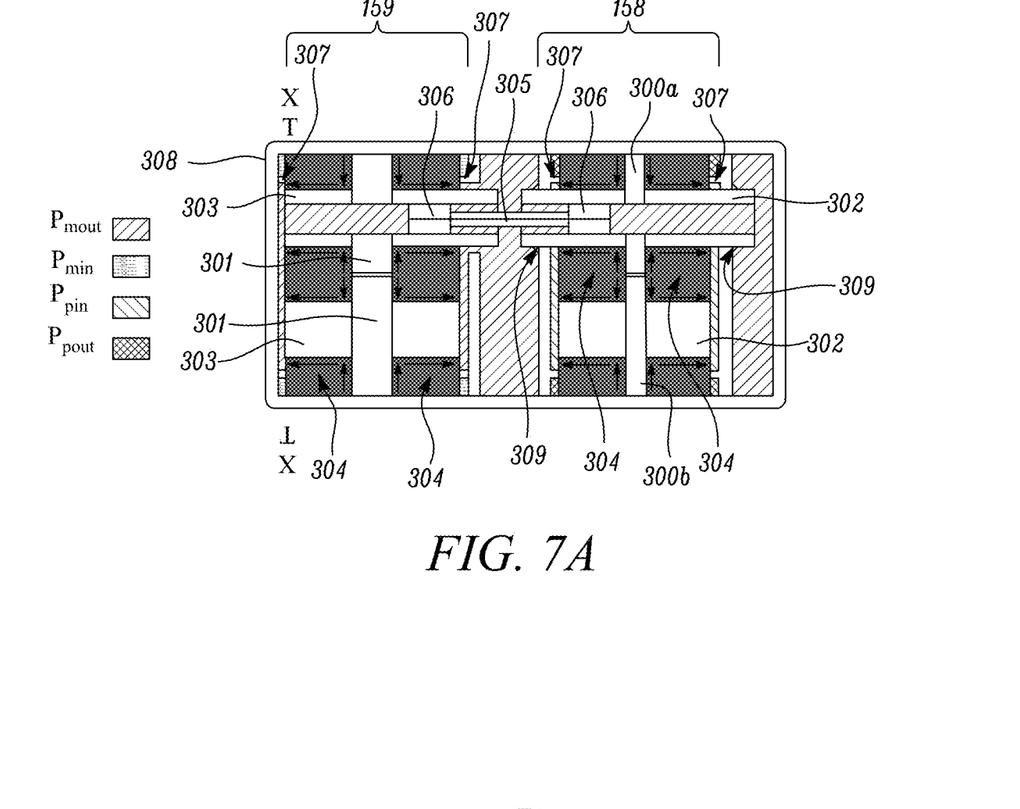
FIG. 7A shows a schematic cross-section through a motor and pump assembly.
Figure 7B:
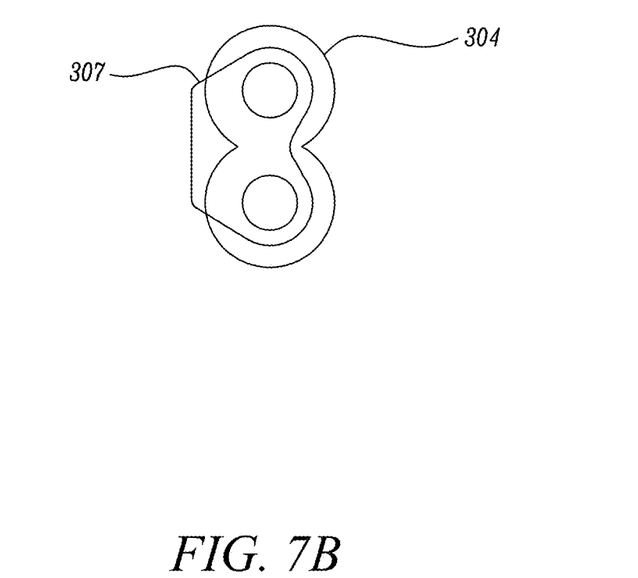
FIG. 7B shows schematically a cross-section through the assembly along line X-X of FIG. 7A.

We turn next to consideration of the mains flow control valves 140 and the split mains fuel manifold 133. Conveniently, the mains flow control valves can be binary operated valves which permit or stop the delivery of metered mains flow to the mains combustion zone for burning. Closure of the mains flow control valves stops the mains flow to the combustor (de-staging), while opening of the valves allows mains flow (staging). Binary operation is caused by application or removal of a pressure differential applied to each binary valve and generated by a staging servo pump (SSP) 58 located in the servo line 133b of the mains fuel manifold and powered by a hydraulic motor 159. The motive fluid for the motor is pressurised fuel obtained from the output of the HP pumping stage. The SSP and the hydraulic motor form a pump and motor assembly, described below in more detail in respect of FIGS. 7 and 8.

As shown in FIGS. 4 and 5, the mains fuel manifold is split into the primary 133a and servo 133b lines at a cooling flow washed filter (CFWF) 163. The SSP 158 is a gear-type positive displacement pump which draws flow through the CFWF into the servo line. Both the primary and the servo lines extend through each mains flow control valve 140 in series, before reuniting downstream of a back pressure orifice (BPO) 161. Thus the portion of the mains flow diverted through the servo line ultimately returns to the primary line for burning. The BPO provides a restriction to flow that generates a pressure differential across the SSP.

The mains flow control valves 140 each have a chamber containing a movable, spring-biased piston, with the chamber to a servo (spring) side of the piston being in fluid communication with the servo line 133b and the chamber to a primary (non-spring) side of the piston being in fluid communication with the primary line 133a. With a faster pump speed of the SSP 158, a higher pressure differential can be generated across the pistons. A high pressure differential overcomes a closing spring bias acting on the pistons, such that the valves open for staging. Removal of the differential allows the spring bias to close the valves.

As the mains flow control valves 140 are binary operated valves which do not rely on the pressure of the pilot flow, a mains throttle valve 162 can be provided in the splitting unit 150 to displace flow in a similar way to conventional FSVs.

The velocity of opening of the mains flow control valves 140 is determined by: the force balance on their pistons, the size of the restriction of the BPO 161 and the flow made available from the SSP 158. In contrast, the velocity of closing of the mains flow control valves is determined from their force balance and the size of the BPO restriction alone, since the pump speed is reduced (e.g. to zero) when de-staging. Advantageously, the staging system can effect a fast transition of the mains flow control valves from one end to another.

After completion of de-staging, the SSP 158 can be run at a slow speed such that some of the cooling flow generated by the splitting unit 150 (as discussed above) is sent through the servo line 133b as well as through the primary line 133a. The relative amounts of the cooling flows through the lines can be managed by appropriate control of pump speed informed by measurement of servo pressure differential between lines 133b and 133a or flow rate in the servo line 133b.

A position sensor, e.g. in the form of an LVDT 164, on the non-return valve 157 can be used to provide flow measurement and thereby identify the occurrence of a mains flow control valve 140 that has failed in an open position when required to be closed. The EEC can then take suitable action to end the delivery of the cooling flow by ceasing the delivery of total flow to the staging unit or staging in mains to maintain delivery of engine power, albeit at the expense undesired engine emissions. More particularly, if a mains flow control valve fails in an open position when it should be closed, the subsequent leakage of cooling flow to the combustion process results in a lower pressure in the mains fuel manifold 133 than in the pilot fuel manifolds 131, 132. This then causes the non-return valve to close when it should be open, thereby announcing the failure.

A relief valve 160 connected across the SSP 158 can be provided to limit pressures in the servo line 133b in the event of blockage of the BPO 161. However, this relief function can be provided through limitation of input power to drive the SSP if the pump speed is measured.

Figure 6:
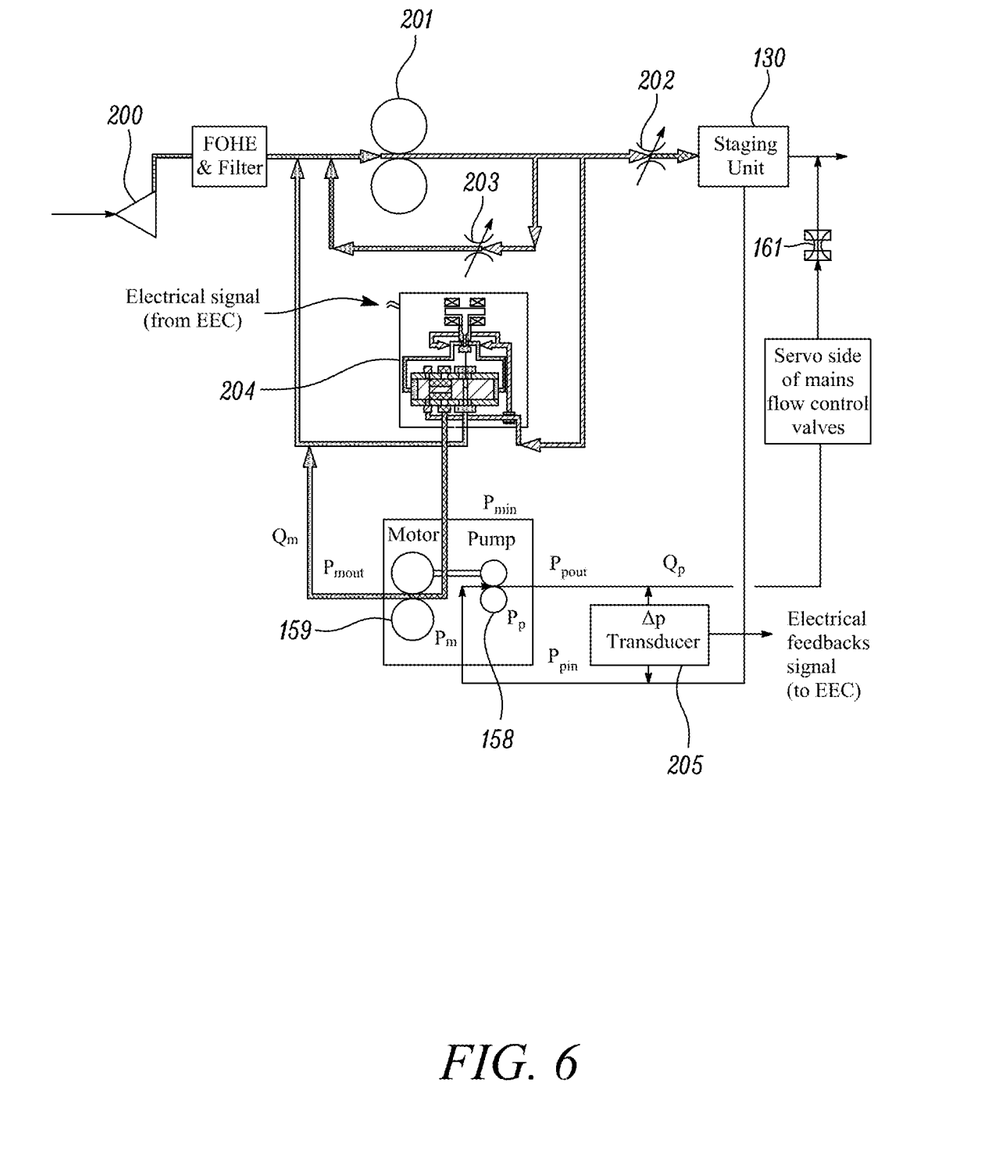
FIG. 6 shows schematically a motor and pump unit of the staging system.

We turn next to the motor and pump assembly formed by the SSP 158 and the hydraulic motor 159. FIG. 6 shows schematically the motor and pump unit in the context of the engine's pumping unit comprising the LP pumping stage 200 and the HP pumping stage 201 (shown as a single gear pump, but it could be e.g. a dual gear pump), the fuel metering valve 202 of the HMU, and the staging system 130.

The motive power for the hydraulic motor 159 is taken from the high pressure fuel output by the HP pumping stage 201, some of which is spilled back to low pressure through a spill valve 203 of the HMU. Thus some of the power that would otherwise be wasted as heat input into the fuel is used to drive the SSP 158 before being spilled back to low pressure. The SSP and the motor are both of external gear pinion type.

A servo-valve 204 receives an input signal from the EEC to control communication between the pressurised fuel supply from the HP pumping stage 201 and the inlet of the hydraulic motor 159. For example, a two stage servo-valve can be provided for this function due to the magnitude of flows required to attain peak motor speed. The EEC generally requires a feedback signal to determine the control flow that should be ported to the hydraulic motor to ensure adequate flow/pressure is provided by the SSP 158. One option is to provide a differential pressure transducer 205 to sense the pressure difference between the inlet and the outlet of the SSP caused by passing flow pumped by the SSP through the BPO 161.

FIG. 7A shows a schematic cross-section through the motor and pump assembly formed by the SSP 158 and the hydraulic motor 159. The SSP 158 has a pair of meshing drive 300a and driven 300b pinion gears and the motor 159 likewise has a pair of meshing pinion gears 301. The gears are mounted on respective journals 302, 303. The journals for each pair of meshing gears are supported on opposite sides of the gear pair by first and second bearing blocks 304, whereby each bearing block has a running face adjacent to its pair of gears and a non-running face distal from its pair of gears.

To transfer the rotation of the pinion gears 301 of the motor 159 to the drive gear 300a of the pump 158, a mechanical linkage 305, which can conveniently be in the form of a shaft having splined couplings 306 at each end, extends between respective bores of one of the pinion gears 301 of the motor 159 and the drive gear 300a of the pump 158, the splined couplings drivingly engaging to corresponding splined formations on the interior surfaces of these bores. The two pairs of meshing pinion gears can thus be compactly arranged in the assembly with each gear from one pair being co-axial with one gear from the other pair.

The bearing blocks 304 are of "figure-of-eight" type, whereby each block supports two journals. FIG. 7B shows schematically a cross-section through the assembly along line X-X of FIG. 7A, and illustrates the non-running face of one of the blocks of the motor 159. Elastomeric static seals 307, which can conveniently be cardioid-shaped, act on the non-running of the bearing blocks 304, the seals being received in respective seal grooves formed in walls of a housing 308 which contains the pump 158 and the motor 159. The compression of these seals determines a mechanical portion of the axial loads acting on the bearing blocks, although the hydraulic pressure distribution produced by the shape of the seals 307 determines a more significant hydraulic portion of these loads.

The static seals 307 for the motor 159 divide the space around the gears 301 between a high pressure region which receives the high pressure fuel (at $P_{min}$) output by the HP pumping stage 201, and a low pressure region from which the fuel (now at $P_{mout}$) is spilled back to the input to HP pumping stage. Similarly, the static seals 307 for the pump 158 divide the space around the pinion gears 300a, 300b between a low pressure region which receives the flow (at $P_{pin}$) in the servo line 133b from the CFWF 163 and a high pressure region from which the pumped servo flow (now at $P_{pout}$) continues along the servo line towards the mains flow control valves 140.

In addition to these static seals 307, two dynamic shaft seals 309 on opposite ends of the journal 302 of the drive gear 300a of the pump 158 seal the journal to the housing 308 to reduce or prevent fugitive leakage between the motive flow fuel circuit powering the motor 159 and the fuel pump circuit providing the servo flow by sealing the low pressure region of the motor from the low pressure region of the pump. As the motive flow is metered, minimising any such fugitive leakage improves the accuracy of the staging system 130. However, the dynamic seals also ensure the desired pressures are presented to the non-running faces of the bearing blocks 304 where the static seals act. Thus the dynamic seals play a role in combination with the static seals in controlling the axial loads on the bearing blocks, and thus in enabling high volumetric efficiency of the motor and pump while improving operational reliability and component life by reducing a risk of overloading the bearings in the axial direction.

Figure 8:
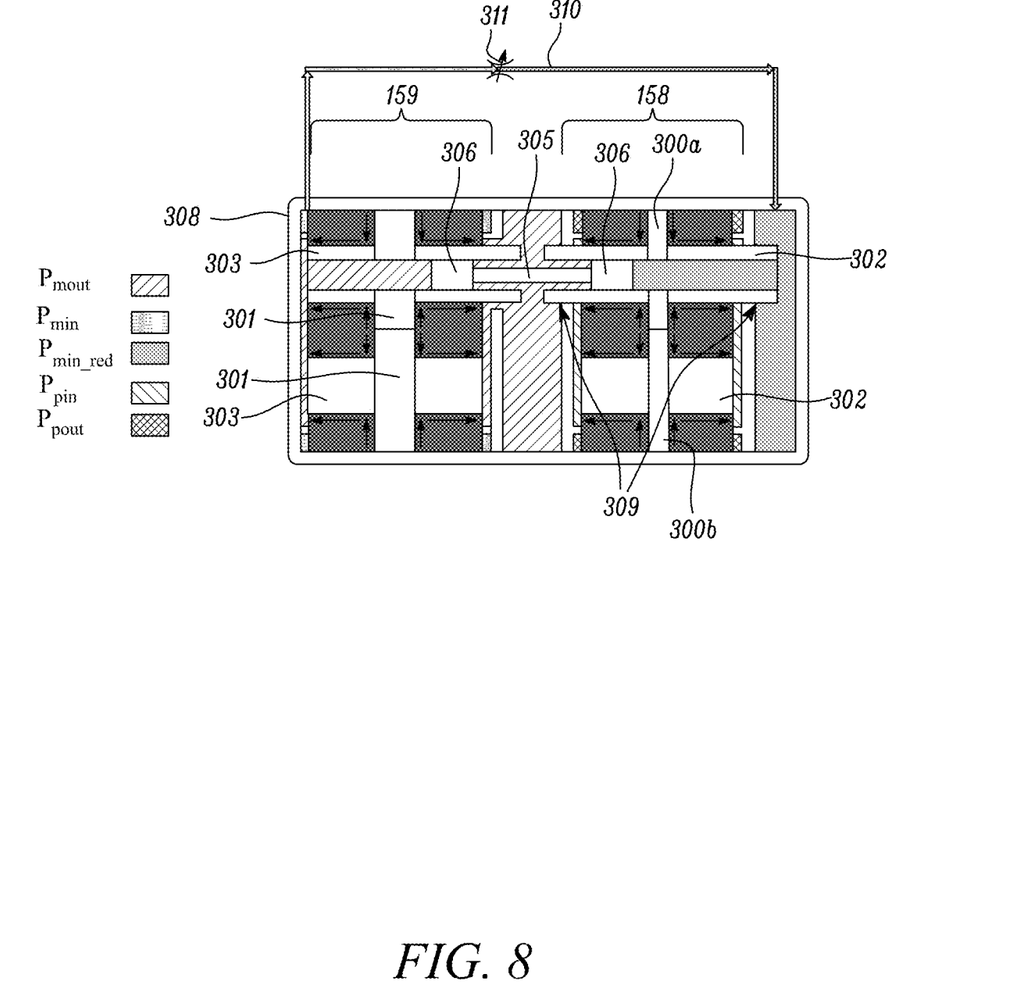
FIG. 8 shows a schematic cross-section through a variant of the motor and pump assembly.

FIG. 8 shows a schematic cross-section through a variant of the motor and pump assembly formed by the SSP 158 and the hydraulic motor 159. In the variant a first controlled leakage path 310 is provided from the high pressure region of the motor to an intermediate pressure region of the assembly. The pressure of the fuel in the intermediate pressure region is at pressure ($P_{min\_red}$) which is intermediate to that of the high and low pressure regions of the motor. For example, a calibrated orifice 311 in the first controlled leakage path can produce the desired pressure in the intermediate pressure region.

The intermediate pressure region fluidly communicates with the bore of the journal 302 of the drive gear 300a of the pump 158. A second controlled leakage path from the bore of the journal of the drive gear, through the splined coupling 306 of the journal of the drive gear, and into the low pressure region of the motor is thus produced which lubricates this splined coupling. The splined coupling at the other end of the mechanical linkage 305 is then lubricated by a small pressure difference between the pressure in the centre volume between the pump 158 and motor 159 and the pressure at the back of the motor. In this way, the wear resistance of the splined couplings can be improved by the removal of debris created at bearing surfaces.

Although discussed above in respect of an external gear pinion motor and an external gear pinion pump, the arrangement of static and dynamic seals described above can be applied to other types of motor and/or pump, such as vane or gerotor machines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

All reference referred to above are hereby incorporated by reference.

We claim:

1. An assembly of a servo pump and a hydraulic motor, wherein:
    the assembly has a housing which contains the servo pump and the hydraulic motor;
    the hydraulic motor has a rotating body which rotates under the motive power of a pressurised motor liquid flow, whereby the hydraulic motor has a high pressure region ($P_{min}$) which receives the pressurised motor liquid flow, and a low pressure region ($P_{mout}$) through which the motor liquid flow leaves the hydraulic motor;
    the servo pump has a rotating body, whereby the servo pump has a low pressure region ($P_{pin}$) which receives servo liquid flow to be pumped by its rotating body, and a high pressure region ($P_{pout}$) through which pressurised servo liquid flow leaves the servo pump;
    each rotating body is mounted on a respective journal, each journal being supported on one side of its rotating body by a respective first bearing block and being supported on the opposite side of its rotating body by a respective second bearing block, each bearing block having a running face adjacent to its rotating body and a non-running face distal from its rotating body;
    the assembly has a mechanical linkage having a coupling at one end to the journal of the motor rotating body and a coupling at an opposite end to the journal of the pump rotating body such that the rotation of the motor rotating body is transferred via the mechanical linkage to the pump rotating body;
    respective static seals seal the non-running faces of the bearing blocks to the housing such that the high pressure region of the hydraulic motor ($P_{min}$) is sealed from the low pressure region ($P_{mout}$) of the hydraulic motor, and the high pressure region ($P_{pout}$) of the pump is sealed from the low pressure region ($P_{pin}$) of the servo pump; and
    a pair of dynamic seals on opposite sides of the pump rotating body seal the journal of the pump rotating body to the housing to seal the low pressure region ($P_{mout}$) of the hydraulic motor from the low pressure region ($P_{pin}$) of the servo pump.

2. The assembly according to claim 1, which further has:
a first controlled leakage path from the high pressure region ($P_{min}$) of the hydraulic motor to an intermediate pressure region ($P_{min\_red}$) of the assembly, the intermediate pressure region being in fluid communication with a bore of the journal of the pump rotating body, and the first controlled leakage path being configured to reduce the pressure of the pressurised motor liquid flow such that the motor liquid in the intermediate pressure region is at pressure intermediate to that of the high and low pressure ($P_{mout}$) regions of the hydraulic motor; and
a second controlled leakage path from the bore of the journal of the pump rotating body to the low pressure region ($P_{mout}$) of the hydraulic motor;
whereby the first and second controlled leakage paths produce a leakage flow of the motor liquid through the bore which lubricates the couplings of the mechanical linkage.

3. The assembly according to claim 1, wherein:
the hydraulic motor is an external gear pinion motor having a pair of meshing pinion gears which rotate under the motive power of the pressurised motor liquid flow;
the servo pump is an external gear pinion pump having a pair of meshing pinion gears, one of the pinion gears of the servo pump being a drive gear and the other of the pinion gears of the servo pump being a driven pinion gear;
each pinion gear is mounted on a respective journal, the two journals of each pair of meshing pinion gears being supported on one side of the gear pair by a respective first bearing block and being supported on the opposite side of the gear pair by a respective second bearing block, each bearing block having a running face adjacent to its pair of gears and a non-running face distal from its pair of gears;
the coupling at one end of the mechanical linkage is to the journal of a first one of the pinion gears of the hydraulic motor and the coupling at the opposite end is to the journal of the drive gear of the servo pump such that the rotation of the pinion gears of the hydraulic motor is transferred via the mechanical linkage to the drive gear of the servo pump;
the pair of dynamic seals are on opposite sides of the drive gear of the servo pump, thereby sealing the journal of the drive gear to the housing.

4. The assembly according to claim 3, wherein the static seals are cardioid-shaped to seal each high pressure region from the respective low pressure region.

5. The assembly according to claim 1, wherein the couplings of the mechanical linkage are respective splined couplings.

6. The assembly according to claim 1, wherein the motor liquid and the servo liquid are the same liquid.

7. The assembly according to claim 1, wherein the motor liquid and the servo liquid are fuel for a combustion engine.

8. A combustion staging system for fuel injectors of a multi-stage combustor of a gas turbine engine, the combustion staging system having:
a splitting unit which receives a metered total fuel flow and controllably splits the metered total fuel flow into out-going pilot and mains fuel flows to perform pilot-only and pilot-and-mains staging control of the combustor;
pilot and mains fuel manifolds which respectively receive the pilot and mains fuel flows;
a plurality of mains flow scheduling valves which distribute the mains fuel flow from the mains fuel manifold to mains discharge orifices of respective injectors of the combustor; and
a servo line which extends through each of the mains flow scheduling valves in series, the servo line being controllably fillable with pressurised fuel to change the pressure in the servo line relative to pressure in the mains fuel manifold;
wherein each mains flow scheduling valve has a chamber containing a movable piston, the chamber to a mains side of the piston being fed by the mains fuel manifold, the chamber to a servo side of the piston being fed by the servo line, the piston having an open pilot-and-mains position which allows flow out of the mains side of the chamber to the mains discharge orifice of the respective injector, the piston being biased towards a closed pilot-only position which prevents flow out of the mains side of the chamber to the mains discharge orifice of the respective injector, and the piston being movable to the closed position under an increase in pressure in the servo line relative to the mains fuel manifold; and
wherein the combustion staging system further has an assembly according to claim 1, the servo pump being operable to change the fuel pressure in the servo line, and motive power for the hydraulic motor being fuel diverted from a high pressure output of a fuel pump of the gas turbine engine, the hydraulic motor returning the diverted fuel to a low pressure input of the fuel pump.

9. A fuel supply system having:
a fuel pump having a low pressure input and a high pressure output;
a fuel metering valve which is configured to receive a flow of pressurised fuel from the high pressure output and to form therefrom a metered total fuel flow; and
a combustion staging system according to claim 8, the splitting unit of the combustion staging system receiving the metered total fuel flow from the fuel metering valve, and the motive power for the hydraulic motor being fuel diverted from the high pressure output of the fuel pump, the hydraulic motor returning the diverted fuel to the low pressure input of the fuel pump.

* * * * *